George Wetzler's Dinner-Can
116780
PATENTED JUL 4 1871
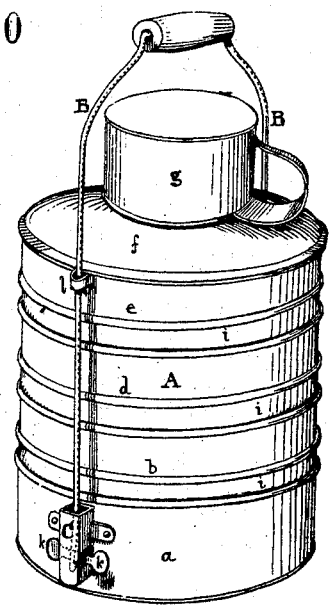
Fig. 1.
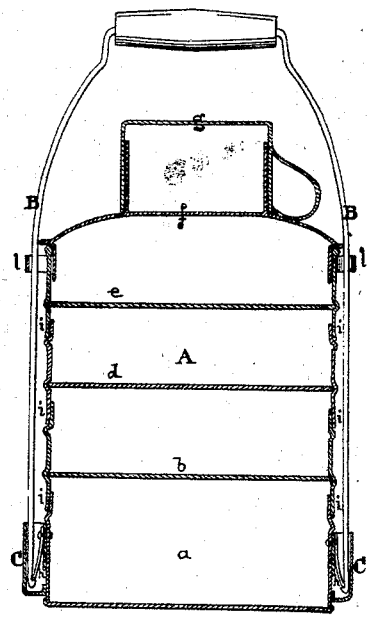
Fig. 2.
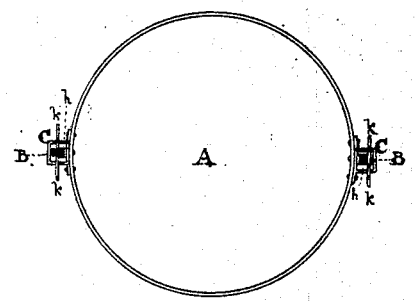
Fig. 4.
Fig. 3.
Witnesses.
Henry W. Wells
A. A. Howard
Inventor
George Wetzler.
By Attorney G. B. Towes

UNITED STATES PATENT OFFICE.

GEORGE WETZLER, OF PEORIA, ILLINOIS.

IMPROVEMENT IN DINNER-PAILS.

Specification forming part of Letters Patent No. 116,780, dated July 4, 1871.

*To all whom it may concern:*

Be it known that I, GEORGE WETZLER, of the city of Peoria, in the county of Peoria and in the State of Illinois, have invented an Improved Dinner-Can or Pail for Carrying Meals or Lunch; and do hereby declare that the following is a full, clear, and exact description thereof, reference being had to the annexed drawing making a part of this specification, in which like letters of reference refer to like parts, and in which—

Figure 1 represents a perspective view; Fig. 2, a sectional elevation; Fig. 3, a plan; Fig. 4, diagram of catch or bail.

My invention relates to a series of cups which are set over one another as a dinner or lunch-pail, the coffee or tea-receptacle, being the lowest, to allow the steam from the latter to heat the articles in those above; and the invention consists in securing the cups thus arranged by a wire holder or bail, forming a handle at the top and having a notch made in it at each end, and arranged so as to extend down on each side of the can through rings or ears attached to the sides of the upper cup and thence into boxes attached to the sides of the lower cup, where the notches catch and fasten onto springs suitably arranged in the boxes, the springs being constructed to project out at each side of the box so as to permit of their being pressed back, and thus release the ends of the holder so that it may be withdrawn and the cups taken apart as may be desired. By this arrangement the several cups can be separated and raised sufficiently above one another to allow of the coffee or other article being placed therein without removing the holder or bail; or the cups between the upper and lower ones, for greater convenience, may be entirely removed for the purpose, and also that the position of the holder is such as to keep the drinking-cup securely in place.

A represents a nest of cups, which have each a rim, $i$, below their respective bottoms, which fits over and incloses the cup below. A rib is worked in the tin material of the latter, against which the over-fitting edge of the former abuts. The receptacle $a$ is made larger than the others, to contain coffee or tea. The receptacles $b\ d\ e$ are capped by the usual cover $f$, which carries a cup, $g$, above. The cup $e$ has projecting from each side a ring or ear, $l$, through which the holder or bail is passed. B, the holder or bail, consisting of a horizontal handle, and terminating downward in two long arms, each ending in a small hook, or having a notch made in it at each end, which hook or notch is retained by a spring, $h$, in the boxes C C. These boxes are each attached to opposite sides of the lower cup $a$, each carrying a spring, $h$, which is fastened to the upper part of the box, and its free end passing downward to the opposite side of the box when the end of holder or bail is not inserted; but it is caused to yield to the passage of the point of the bail, and then catches and prevents the bail from being withdrawn while the can or pail is being carried by the holder or bail. The springs $h\ h$ have projecting from them laterally arms $k\ k$, which pass through openings in the sides of their respective boxes.

The operation is as follows: The bail or holder B B is removed by pressing the arms $k\ k$ of the springs $h\ h$, which release the hooks, and the holder or bail is raised vertically out of the rings $l\ l$, leaving the cups without encumbrance of that nature. The cups respectively embrace or fit over the edge of the one below, keeping out water or rain, and, unlike other pails of this kind, in which the separate cups fitting one into the other allow accidental moisture or rain to run into the viands; and, unlike other cans, the coffee-holder is open that it may be thoroughly cleansed at each time of using, whereas the common coffee-holders attached to such cans, from being closed, are difficult of access for such purposes.

Having thus fully described my invention, what I claim therein as new, and desire to secure by Letters Patent, is—

In combination with the dinner-can or pail A, the detachable wire-holder or bail B B, rings or ears $l\ l$, boxes C C, and springs $h\ h$, the whole constructed and operating substantially as described.

In testimony that I claim the foregoing dinner-can I have hereunto set my hand this 20th day of February, 1871.

GEORGE WETZLER.

Witnesses:
HENRY W. WELLS,
AUBURN A. HOWARD.